(12) United States Patent
Nakagawa

(10) Patent No.: US 7,245,617 B2
(45) Date of Patent: Jul. 17, 2007

(54) QUEUING PACKETS WRITTEN TO MEMORY FOR SWITCHING

(75) Inventor: Yukihiro Nakagawa, Cupertino, CA (US)

(73) Assignee: Fujitsu Limited, Kawasaki (JP)

(*) Notice: Subject to any disclaimer, the term of this patent is extended or adjusted under 35 U.S.C. 154(b) by 1072 days.

(21) Appl. No.: 10/360,079

(22) Filed: Feb. 7, 2003

(65) Prior Publication Data
US 2004/0156359 A1 Aug. 12, 2004

(51) Int. Cl.
*H04L 12/28* (2006.01)
*H04L 12/56* (2006.01)

(52) U.S. Cl. .................. 370/389; 370/429; 370/412

(58) Field of Classification Search ............ 370/389, 370/401, 412–417, 428, 429; 710/52–57; 711/100, 108, 147, 149, 153
See application file for complete search history.

(56) References Cited

U.S. PATENT DOCUMENTS

| | | | |
|---|---|---|---|
| 6,029,205 A * | 2/2000 | Alferness et al. ............ | 719/310 |
| 6,049,526 A * | 4/2000 | Radhakrishnan et al. ... | 370/229 |
| 2003/0026589 A1* | 2/2003 | Barton et al. ................ | 386/46 |
| 2004/0257891 A1* | 12/2004 | Kim et al. ................... | 365/200 |
| 2006/0010265 A1* | 1/2006 | Aiken et al. ................. | 710/33 |
| 2006/0050690 A1* | 3/2006 | Epps et al. .................. | 370/359 |

OTHER PUBLICATIONS

Cyriel Minkenberg and Ton Engbersen, "A Combined Input and Output Queued Packet-Switched System Based on PRIZMA Switch-on-a-Chip Technology," IEEE Communications Magazine, pp. 70-77, Dec. 2000.
James P. G. Sterbenz and Joseph D. .Touch, "High-Speed Networking," 5 pages, 2001.
Abhijit K. Choudhury and Ellen L. Hahne, "Dynamic Queue Length Thresholds for Shared-Memory Packet Switches," IEEE/ACM Transactions on Networking, , vol. 6, No. 2, pp. 130-140, Apr. 1998.
M. Shreedhar and George Varghese, "Efficient Fair Queuing using Deficit Round Robin," pp. 1-21, Oct. 16, 1995.

* cited by examiner

*Primary Examiner*—Ajit Patel
(74) *Attorney, Agent, or Firm*—Baker Botts L.L.P.

(57) ABSTRACT

A system for queuing packets written to memory for switching includes a data memory logically divided into multiple blocks. The system also includes multiple input ports each operable to receive packets and write the packets to the data memory. The system also includes multiple output ports each having a memory structure and one or more output queue pointers. The memory structure includes multiple memory structure entries that each correspond to one of the blocks. Each of the memory structure entries includes a memory structure next pointer that can link to another one of the memory structure entries. An output queue pointer can link to one of the memory structure entries, and the output queue pointers and memory structure next pointers form output queue linked lists. Each of the output ports can read packets stored in the data memory using the output queue linked lists and communicate the packets.

22 Claims, 4 Drawing Sheets

US 7,245,617 B2

QUEUING PACKETS WRITTEN TO MEMORY FOR SWITCHING

TECHNICAL FIELD OF THE INVENTION

This invention relates generally to communication systems and more particularly to queuing packets written to memory for switching.

BACKGROUND OF THE INVENTION

High-speed serial interconnects have become more common in communications environments, and, as a result, the role that switches play in these environments has become more important. Traditional switches do not provide the scalability and switching speed typically needed to support these interconnects.

SUMMARY OF THE INVENTION

Particular embodiments of the present invention may reduce or eliminate disadvantages and problems traditionally associated with switching packets.

In one embodiment of the present invention, a system for queuing packets written to memory for switching includes a data memory logically divided into multiple blocks. The system also includes multiple input ports each operable to receive packets and write the packets to the data memory. The system also includes multiple output ports each having a memory structure and one or more output queue pointers. The memory structure includes multiple memory structure entries that each correspond to one of the blocks. Each of the memory structure entries includes a memory structure next pointer that can link to another one of the memory structure entries. An output queue pointer can link to one of the memory structure entries, and the output queue pointers and memory structure next pointers form output queue linked lists. Each of the output ports can read packets stored in the data memory using the output queue linked lists and communicate the packets.

Particular embodiments of the present invention provide one or more advantages. Particular embodiments reduce memory requirements associated with multicast traffic. In particular embodiments, port modules share memory resources, which tends to eliminate head-of-line blocking, reduce memory requirements, and enable more efficient handling of changes in load conditions at port modules. Particular embodiments provide cut-through forwarding, which provides one or more advantages over store-and-forward techniques. Particular embodiments provide delayed cut-through forwarding, which also provides one or more advantages over store-and-forward techniques. Particular embodiments increase the throughput of a switch core. Particular embodiments increase the speed at which packets are switched by a switch core. Particular embodiments reduce the fall-through latency of a switch core, which is important for cluster applications. Particular embodiments are embodied in a single integrated circuit (IC), or chip. Particular embodiments reduce the power dissipation of a switch core. Particular embodiments can be used in different applications, such as Ethernet switches, INFINIBAND switches, 3GIO switches, HYPERTRANSPORT switches, RAPID IO switches, or proprietary backplane switches. Certain embodiments provide all, some, or none of these technical advantages, and certain embodiments provide one or more other technical advantages readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
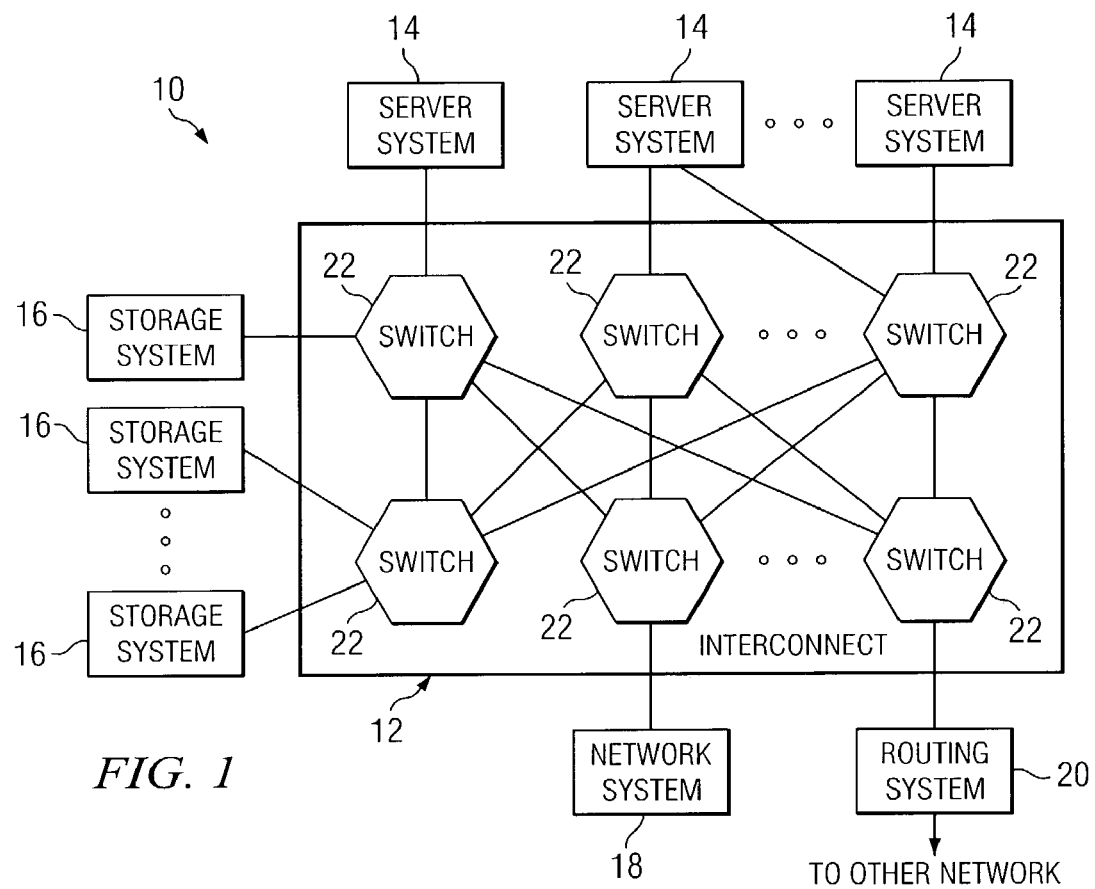
FIG. 1 illustrates an example system area network.

FIG. 1 illustrates an example system area network 10 that includes a serial or other interconnect 12 supporting communication among one or more server systems 14; one or more storage systems 16; one or more network systems 18; and one or more routing systems 20 coupling interconnect 12 to one or more other networks, which include one or more local area networks (LANs), wide area networks (WANs), or other networks. Server systems 14 each include one or more central processing units (CPUs) and one or more memory units. Storage systems 16 each include one or more channel adaptors (CAs), one or more disk adaptors (DAs), and one or more CPU modules (CMs). Interconnect 12 includes one or more switches 22, which, in particular embodiments, include Ethernet switches, as described more fully below. The components of system area network 10 are coupled to each other using one or more links, each of which includes one or more computer buses, local area networks (LANs), metropolitan area networks (MANs), wide area networks (WANs), portions of the Internet, or other wireline, optical, wireless, or other links. Although system area network 10 is described and illustrated as including particular components coupled to each other in a particular configuration, the present invention contemplates any suitable system area network including any suitable components coupled to each other in any suitable configuration.

Figure 2:
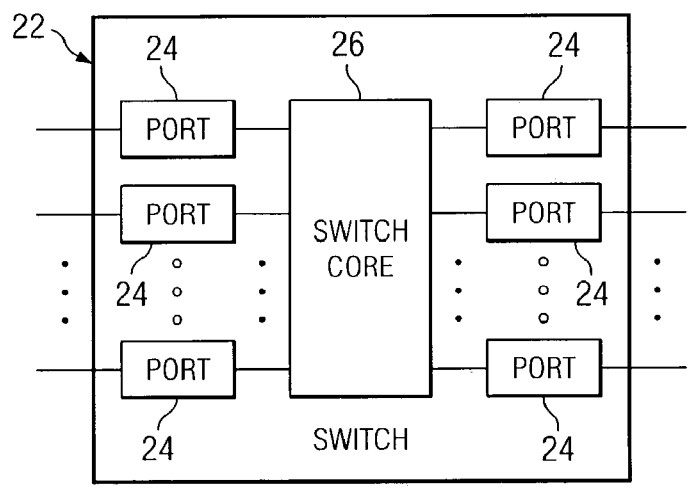
FIG. 2 illustrates an example switch of a system area network.

FIG. 2 illustrates an example switch 22 of system area network 10. Switch 22 includes multiple ports 24 and a switch core 26. Ports 24 are each coupled to switch core 26 and a component of system area network 10 (such as a server system 14, a storage system 16, a network system 18, a routing system 20, or another switch 22). A first port 24 receives a packet from a first component of system area network 10 and communicates the packet to switch core 26 for switching to a second port 24, which communicates the packet to a second component of system area network 10. Reference to a packet can include a packet, datagram, frame, or other unit of data, where appropriate. Switch core 26 receives a packet from a first port 24 and switches the packet to one or more second ports 24, as described more fully below. In particular embodiments, switch 22 includes an Ethernet switch. In particular embodiments, switch 22 can switch packets at or near wire speed.

Figure 3:
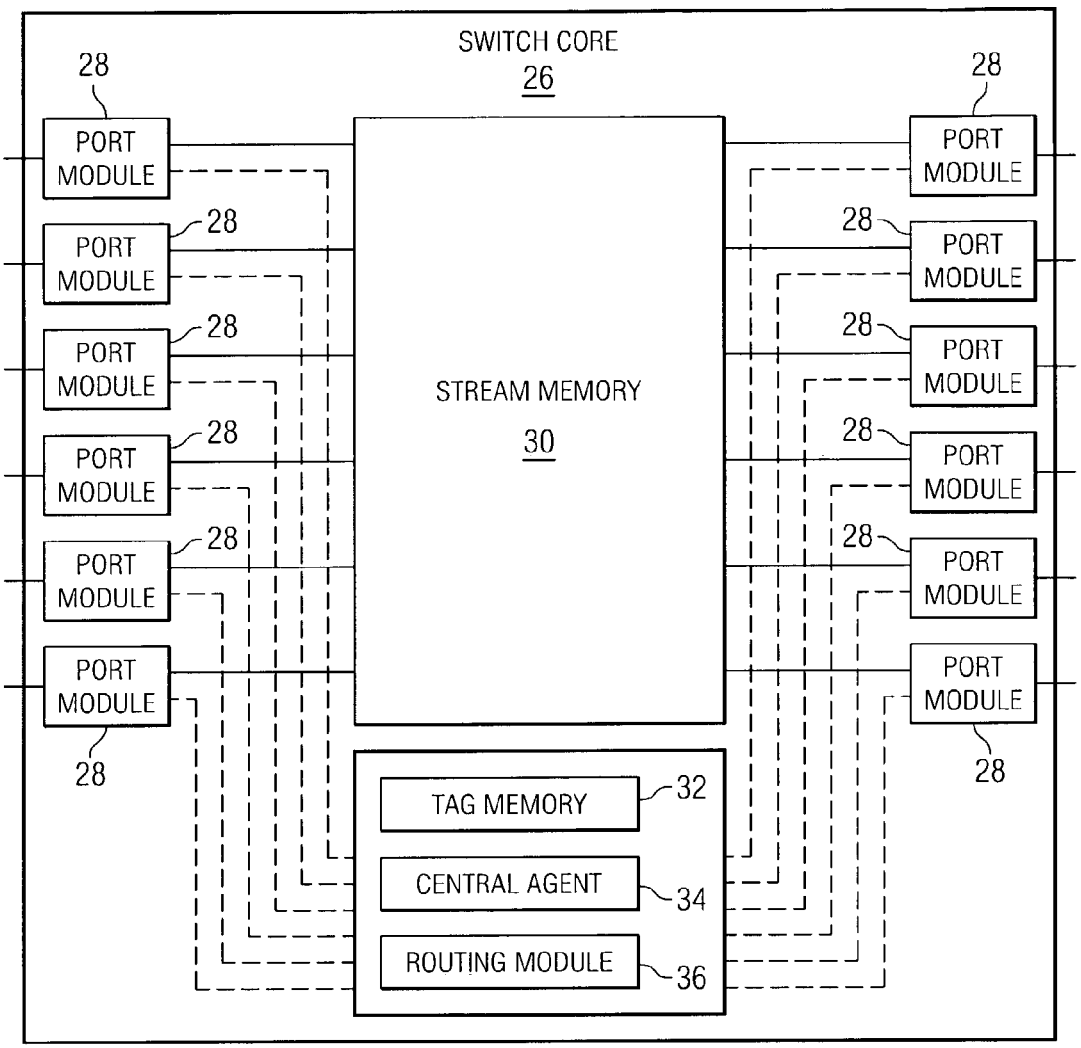
FIG. 3 illustrates an example switch core of a switch.

FIG. 3 illustrates an example switch core 26 of switch 22. Switch core 26 includes twelve port modules 28, stream memory 30, tag memory 32, central agent 34, and routing module 36. The components of switch core 26 are coupled to each other using buses or other links. In particular embodiments, switch core 26 is embodied in a single IC. In a default mode of switch core 26, a packet received by switch core 26 from a first component of system area network 10 can be communicated from switch core 26 to one or more second components of system area network 10 before switch core 26 receives the entire packet. In particular embodiments, cut-through forwarding provides one or more advantages (such as reduced latency, reduced memory requirements, and increased throughput) over store-and-forward techniques. Switch core 26 can be configured for different applications. As an example and not by way of limitation, switch core 26 can be configured for an Ethernet switch 22 (which includes a ten-gigabit Ethernet switch 22 or an Ethernet switch 22 in particular embodiments); an INFINIBAND switch 22; a 3GIO switch 22; a HYPERTRANSPORT switch 22; a RAPID IO switch 22; a proprietary backplane switch 22 for storage systems 16, network systems 18, or both; or other switch 22.

A port module 28 provides an interface between switch core 26 and a port 24 of switch 22. Port module 28 is coupled to port 24, stream memory 30, tag memory 32, central agent 34, and routing table 36. In particular embodiments, port module 28 includes both input logic (which is used for receiving a packet from a component of system area network 10 and writing the packet to stream memory 30) and output logic (which is used for reading a packet from stream memory 30 and communicating the packet to a component of system area network 10). As an alternative, in particular embodiments, port module 28 includes only input logic or only output logic. Reference to a port module 28 can include a port module 28 that includes input logic, output logic, or both, where appropriate. Port module 28 can also include an input buffer for inbound flow control. In an Ethernet switch 22, a pause function can be used for inbound flow control, which can take time to be effective. The input buffer of port module 28 can be used for temporary storage of a packet that is sent before the pause function stops incoming packets. Because the input buffer would be unnecessary if credits are exported for inbound flow control, as would be the case in an INFINIBAND switch 22, the input buffer is optional. In particular embodiments, the link coupling port module 28 to stream memory 30 includes two links: one for write operations (which include operations of switch core 26 in which data is written from a port module 28 to stream memory 30) and one for read operations (which include operations of switch core 26 in which data is read from stream memory 30 to a port module 28). Each of these links can carry thirty-six bits, making the data path between port module 28 and stream memory 30 thirty-six bits wide in both directions.

A packet received by a first port module 28 from a first component of system area network 10 is written to stream memory 30 from first port module 28 and later read from stream memory 30 to one or more second port modules 28 for communication from second port modules 28 to one or more second components of system area network 10. Reference to a packet being received by or communicated from a port module 28 can include the entire packet being received by or communicated from port module 28 or only a portion of the packet being received by or communicated from port module 28, where appropriate. Similarly, reference to a packet being written to or read from stream memory 30 can include the entire packet being written to or read from stream memory 30 or only a portion of the packet being written to or read from stream memory 30, where appropriate. Any port module 28 that includes input logic can write to stream memory 30, and any port module 28 that includes output logic can read from stream memory 30. In particular embodiments, the sharing of stream memory 30 by port modules 28 eliminates head-of-line blocking (thereby increasing the throughput of switch core 26), reduces memory requirements associated with switch core 26, and enables switch core 26 to more efficiently handle changes in load conditions at port modules 28.

Figure 4:
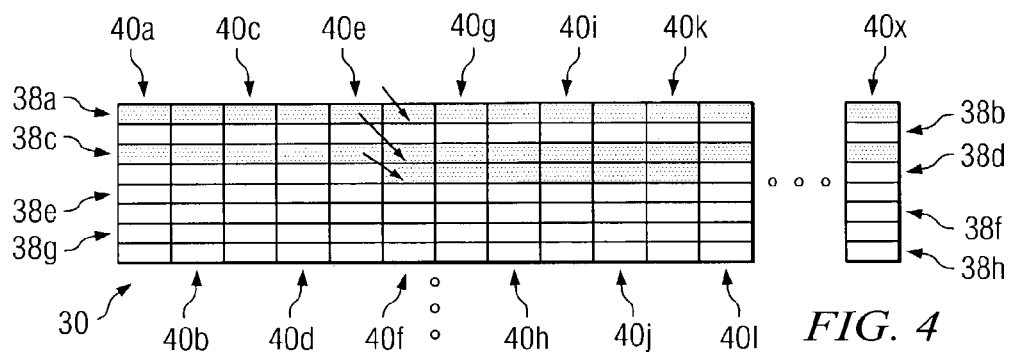
FIG. 4 illustrates an example stream memory of a switch core logically divided into blocks.

Stream memory 30 of switch core 26 is logically divided into blocks 38, which are further divided into words 40, as illustrated in FIG. 4. A row represents a block 38, and the intersection of the row with a column represents a word 40 of block 38. In particular embodiments, stream memory 30 is divided into 1536 blocks 38, each block 38 includes twenty-four words 40, and a word 40 includes seventy-two bits. Although stream memory 30 is described and illustrated as being divided into a particular number of blocks 38 that are divided into a particular number of words 40 including a particular number of bits, the present invention contemplates stream memory 30 being divided into any suitable number of blocks 38 that are divided into any suitable number of words 40 including any suitable number of bits. Packet size can vary from packet to packet. A packet that includes as many bits as or fewer bits than a block 38 can be written to one block 38, and a packet that includes more bits than a block 38 can be written to more than one block 38, which need not be contiguous with each other.

When writing to or reading from a block 38, a port module 28 can start at any word 40 of block 38 and write to or read from words 40 of block 38 sequentially. Port module 28 can also wrap around to a first word 40 of block 38 as it writes to or reads from block 38. A block 38 has an address that can be used to identify block 38 in a write operation or a read operation, and an offset can be used to identify a word 40 of block 38 in a write operation or a read operation. As an example, consider a packet that is 4176 bits long. The packet has been written to fifty-eight words 40, starting at word 40*f* of block 38*a* and continuing to word 40*k* of block 38*d*, excluding block 38*b*. In the write operation, word 40*f* of block 38*a* is identified by a first address and a first offset, word 40*f* of block 38*c* is identified by a second address and a second offset, and word 40*f* of block 38*d* is identified by a third address and a third offset. The packet can also be read from stream memory 30 starting at word 40*f* of block 38*a* and continuing to word 40*k* of block 38*d*, excluding block 38*b*. In the read operation, word 40*f* of block 38*a* can be identified by the first address and the first offset, word 40*f* of block 38*c* can be identified by the second address and the second offset, and word 40*f* of block 38*d* can be identified by the third address and the third offset.

Tag memory 32 includes multiple linked lists that can each be used by a first port module 28 to determine a next block 38 to which to write and by one or more second port modules 28 to determine a next block 38 from which to read. Tag memory 32 also includes a linked list that can be used by central agent 34 to determine a next block 38 that can be made available to a port module 28 for a write operation from port module 28 to stream memory 30, as described more fully below. Tag memory 32 includes multiple entries, at least some of which each correspond to a block 38 of stream memory 30. Each block 38 of stream memory 30 has a corresponding entry in tag memory 32. An entry in tag memory 32 can include a pointer to another entry in tag memory 32, resulting in a linked list.

Entries in tag memory 32 corresponding to blocks 38 that are available to a port module 28 for write operations from port module 28 to stream memory 30 can be linked together such that port module 28 can determine a next block 38 to which to write using the linked entries. As an example, consider four blocks 38 that are available to port module 28 for write operations from port module 28 to stream memory 30. A first entry in tag memory 32 corresponding to a first block 38 includes a pointer to a second block 38, a second entry in tag memory 32 corresponding to second block 38 includes a pointer to a third block 38, and a third entry in tag memory 32 corresponding to third block 38 includes a pointer to a fourth block 38. Port module 28 writes to first block 38 and, while port module 28 is writing to first block 38, uses the pointer in the first entry to determine a next block 38 to which to write. The pointer refers port module 28 to second block 38, and, when port module 28 has finished writing to first block 38, port module 28 writes to second block 38. While port module 28 is writing to second block 38, port module 28 uses the pointer in the second entry to determine a next block 38 to which to write. The pointer refers port module 28 to third block 38, and, when port module 28 has finished writing to second block 38, port module 28 writes to third block 38. While port module 28 is writing to third block 38, port module 28 uses the pointer in the third entry to determine a next block 38 to which to write. The pointer refers port module 28 to fourth block 38, and, when port module 28 has finished writing to third block 38, port module 28 writes to fourth block 38. A linked list in tag memory 32 cannot be used by more than one port module 28 to determine a next block 38 to which to write.

When a block 38 is made available to a port module 28 for write operations from port module 28 to stream memory 30, an entry in tag memory 32 corresponding to block 38 can be added to the linked list that port module 28 is using to determine a next block 38 to which to write. As an example, consider the linked list described above. If the fourth entry is the last element of the linked list, when a fifth block 38 is made available to port module 28, the fourth entry can be modified to include a pointer to fifth block 38.

A linked list in tag memory 32 that a first port module 28 is using to determine a next block 38 to which to write can also be used by one or more second port modules 28 to determine a next block 38 from which to read. As an example, consider the linked list described above. A first portion of a packet has been written from first port module 28 to first block 38, a second portion of the packet has been written from first port module 28 to second block 38, and a third and final portion of the packet has been written from first port module 28 to third block 38. An end mark has also been written to third block 38 to indicate that a final portion of the packet has been written to third block 38. A second port module 28 reads from first block 38 and, while second port module 28 is reading from first block 38, uses the pointer in the first entry to determine a next block 38 from which to read. The pointer refers second port module 28 to second block 38, and, when second port module 28 has finished reading from first block 38, second port module 28 reads from second block 38. While second port module 28 is reading from second block 38, second port module 28 uses the pointer in the second entry to determine a next block 38 from which to read. The pointer refers second port module 28 to third block 38, and, when second port module 28 has finished reading from second block 38, second port module 28 reads from third block 38. Second port module 28 reads from third block 38 and, using the end mark in third block 38, determines that a final portion of the packet has been written to third block 38. While a linked list in tag memory 32 cannot be used by more than one first port module 28 to determine a next block 38 to which to write, the linked list can be used by one or more second port modules 28 to determine a next block 38 from which to read.

Different packets can have different destinations, and the order in which packets make their way through stream memory 30 need not be first in, first out (FIFO). As an example, consider a first packet received and written to one or more first blocks 38 before a second packet is received and written to one or more second blocks 38. The second packet could be read from stream memory 30 before the first packet, and second blocks 38 could become available for other write operations before first blocks 38. In particular embodiments, a block 38 of stream memory 30 to which a packet has been written can be made available to a port module 28 for a write operation from port module 28 to block 38 immediately after the packet has been read from block 38 by all port modules 28 that are designated port modules 28 of the packet. A designated port module 28 of a packet includes a port module 28 coupled to a component of system area network 10, downstream from switch core 26, that is a final or intermediate destination of the packet.

In particular embodiments, credits are allocated to input logic of port modules 28 and are used to manage write operations. Using credits to manage write operations can facilitate cut-through forwarding by switch core 26, which reduces latency, increases throughput, and reduces memory requirements associated with switch core 26. Also, if credits are used to manage write operations, determinations regarding which port module 28 can write to which block 38 at which time can be made locally at port modules 28, which increases the throughput and switching speed of switch core 26. Using credits to manage write operations can also eliminate head-of-line blocking and provide greater flexibility in the distribution of memory resources among port modules 28 in response to changing load conditions at port modules 28. A credit corresponds to a block 38 of stream memory 30 and can be used by a port module 28 to write to block 38. A credit can be allocated to a port module 28 from a pool of credits, which is managed by central agent 34. Reference to a credit being allocated to a port module 28 includes a block 38 corresponding to the credit being made available to port module 28 for a write operation from port module 28 to block 38, and vice versa.

A credit in the pool of credits can be allocated to any port module 28 and need not be allocated to any particular port module 28. A port module 28 can use only a credit that is available to port module 28 and cannot use a credit that is available to another port module 28 or that is in the pool of credits. A credit is available to port module 28 if the credit has been allocated to port module 28 and port module 28 has not yet used the credit. A credit that has been allocated to port module 28 is available to port module 28 until port module 28 uses the credit. A credit cannot be allocated to more than one port module 28 at a time, and a credit cannot be available to more than one port module 28 at the same time. In particular embodiments, when a first port module 28 uses a credit to write a packet to a block 38 corresponding to the credit, the credit is returned to the pool of credits immediately after all designated port modules 28 of the packet have read the packet from block 38.

Central agent 34 can allocate credits to port modules 28 from the pool of credits. As an example, central agent 34 can make an initial allocation of a predetermined number of credits to a port module 28. In particular embodiments, central agent 34 can make an initial allocation of credits to port module 28 at the startup of switch core 26 or in response to switch core 26 being reset. As another example, central agent 34 can allocate a credit to a port module 28 to replace another credit that port module 28 has used. In particular embodiments, when port module 28 uses a first credit, port module 28 notifies central agent 34 that port module 28 has used the first credit, and, in response to port module 28 notifying central agent 34 that port module 28 has used the first credit, central agent 34 allocates a second credit to port module 28 to replace the first credit, but only if the number of blocks 38 that are being used by port module 28 does not meet or exceed an applicable limit. Reference to a block 38 that is being used by a port module 28 includes a block 38 to which a packet has been written from port module 28 and from which all designated port modules 28 of the packet have not read the packet. By replacing, up to an applicable limit, credits used by port module 28, the number of credits available to port module 28 can be kept relatively constant and, if the load conditions at port module 28 increase, more blocks 38 can be supplied to port module 28 in response to the increase in load conditions at port module 28. A limit can be applied to the number of blocks used by port module 28, which can prevent port module 28 from using too many blocks 38 and thereby use up too many shared memory resources. The limit can be controlled dynamically based on the number of credits in the pool of credits. If the number of credits in the pool of credits decreases, the limit can also decrease. The calculation of the limit and the process according to which credits are allocated to port module 28 can take place out of the critical path of packets through switch core 26, which increases the switching speed of switch core 26.

A linked list in tag memory 32 can be used by central agent 34 to determine a next credit that can be allocated to a port module 28. The elements of the linked list can include entries in tag memory 32 corresponding to blocks 38 that in turn correspond to credits in the pool of credits. As an example, consider four credits in the pool of credits. A first credit corresponds to a first block 38, a second credit corresponds to a second block 38, a third credit corresponds to a third block 38, and a fourth credit corresponds to a fourth block 38. A first entry in tag memory 32 corresponding to first block 38 includes a pointer to second block 38, a second entry in tag memory 32 corresponding to second block 38 includes a pointer to third block 38, and a third entry in tag memory 32 corresponding to third block 38 includes a pointer to fourth block 38. Central agent 34 allocates the first credit to a port module 28 and, while central agent 34 is allocating the first credit to a port module 28, uses the pointer in the first entry to determine a next credit to allocate to a port module 28. The pointer refers central agent 34 to second block 38, and, when central agent 34 has finished allocating the first credit to a port module 28, central agent 34 allocates the second credit to a port module 28. While central agent 34 is allocating the second credit to a port module 28, central agent 34 uses the pointer in the second entry to determine a next credit to allocate to a port module 28. The pointer refers central agent 34 to third block 38, and, when central agent 34 has finished allocating the second credit to a port module 28, central agent allocates the third credit to a port module 28. While central agent 34 is allocating the third credit to a port module 28, central agent 34 uses the pointer in the third entry to determine a next credit to allocate to a port module 28. The pointer refers central agent 34 to fourth block 38, and, when central agent 34 has finished allocating the third credit to a port module 28, central agent allocates the fourth credit to a port module 28.

When a credit corresponding to a block 38 is returned to the pool of credits, an entry in tag memory 32 corresponding to block 38 can be added to the end of the linked list that central agent 34 is using to determine a next credit to allocate to a port module 28. As an example, consider the linked list described above. If the fourth entry is the last element of the linked list, when a fifth credit corresponding to a fifth block 38 is added to the pool of credits, the fourth entry can be modified to include a pointer to a fifth entry in tag memory 32 corresponding to fifth block 38. Because entries in tag memory 32 each correspond to a block 38 of stream memory 30, a pointer that points to a block 38 also points to an entry in tag memory 32.

When a port module 28 receives an incoming packet, port module 28 determines whether enough credits are available to port module 28 to write the packet to stream memory 30. In particular embodiments, if enough credits are available to port module 28 to write the packet to stream memory 30, port module 28 can write the packet to stream memory 30 using one or more credits. In particular embodiments, if enough credits are not available to port module 28 to write the packet to stream memory 30, port module 28 can write the packet to an input buffer and later, when enough credits are available to port module 28 to write the packet to stream memory 30, write the packet to stream memory 30 using one or more credits. As an alternative to port module 28 writing the packet to an input buffer, port module 28 can drop the packet. In particular embodiments, if enough credits are available to port module 28 to write only a portion of the packet to stream memory 30, port module 28 can write to stream memory 30 the portion of the packet that can be written to stream memory 30 using one or more credits and write one or more other portions of the packet to an input buffer. Later, when enough credits are available to port module 28 to write one or more of the other portions of the packet to stream memory 30, port module 28 can write one or more of the other portions of the packet to stream memory 30 using one or more credits. In particular embodiments, delayed cut-through forwarding, like cut-through forwarding, provides one or more advantages (such as reduced latency, reduced memory requirements, and increased throughput) over store-and-forward techniques. Reference to a port module 28 determining whether enough credits are available to port module 28 to write a packet to stream memory 30 includes port module 28 determining whether enough credits are available to port module 28 to write the entire packet to stream memory 30, write only a received portion of the packet to stream memory 30, or write at least one portion of the packet to stream memory 30, where appropriate.

In particular embodiments, the length of an incoming packet cannot be known until the entire packet has been received. In these embodiments, a maximum packet size (according to an applicable set of standards) can be used to determine whether enough credits are available to a port module 28 to write an incoming packet that has been received by port module 28 to stream memory 30. According to a set of standards published by the Institute of Electrical and Electronics Engineers (IEEE), the maximum size of an Ethernet frame is 1500 bytes. According to a de facto set of standards, the maximum size of an Ethernet frame is nine thousand bytes. As an example and not by way of limitation, consider a port module 28 that has received only a portion of an incoming packet. Port module 28 uses a maximum packet size (according to an applicable set of standards) to determine whether enough credits are available to port module 28 to write the entire packet to stream memory 30. Port module 28 can make this determination by comparing the maximum packet size with the number of credits available to port module 28. If enough credits are available to port module 28 to write the entire packet to stream memory 30, port module 28 can write the received portion of the packet to stream memory 30 using one or more credits and write one or more other portions of the packet to stream memory 30 using one or more credits when port module 28 receives the one or more other portions of the packet.

A port module 28 can monitor the number of credits available to port module 28 using a counter. When central agent 34 allocates a credit to port module 28, port module 28 increments the counter by an amount, and, when port module 28 uses a credit, port module 28 decrements the counter by an amount. The current value of the counter reflects the current number of credits available to port module 28, and port module 28 can use the counter to determine whether enough credits are available to port module 28 to write a packet from port module 28 to stream memory 30. Central agent 34 can also monitor the number of credits available to port module 28 using a counter. When central agent 34 allocates a credit to port module 28, central agent 34 increments the counter by an amount, and, when port module 28 notifies central agent 34 that port module 28 has used a credit, central agent 34 decrements the counter by an amount. The current value of the counter reflects the current number of credits available to port module 28, and central agent 34 can use the counter to determine whether to allocate one or more credits to port module 28. Central agent 34 can also monitor the number of blocks 38 that are being used by port module 28 using a counter. When port module 28 notifies central agent 34 that port module 28 has written to a block 38, central agent increments the counter by an amount and, when a block 38 to which port module 28 has written is released and a credit corresponding to block 38 is returned to the pool of credits, central agent decrements the counter by an amount.

The number of credits that are available to a port module 28 can be kept constant, and the number of blocks 38 that are being used by port module 28 can be limited. The limit can be changed in response to changes in load conditions at port module 28, one or more other port module 28, or both. In particular embodiments, the number of blocks 38 that are being used by a port module 28 is limited according to a dynamic threshold that is a function of the number of credits in the pool of credits. An active port module 28, in particular embodiments, includes a port module 28 that is using one or more blocks 38. Reference to a port module 28 that is using a block 38 includes a port module 28 that has written at least one packet to stream memory 30 that has not been read from stream memory 30 to all designated port modules 28 of the packet. A dynamic threshold can include a fraction of the number of credits in the pool of credits calculated using the following formula, in which $\alpha$ equals the number of port modules 28 that are active and $\rho$ is a parameter:

$$\frac{\rho}{1+(\rho \times \alpha)}$$

A number of credits in the pool of credits can be reserved to prevent central agent 34 from allocating a credit to a port module 28 if the number of blocks 38 that are each being used by a port module 28 exceeds an applicable limit, which can include the dynamic threshold described above. Reserving one or more credits in the pool of credits can provide a cushion during a transient period associated with a change in the number of port modules 28 that are active. The fraction of credits that are reserved is calculated using the following formula, in which $\alpha$ equals the number of active port modules 28 and $\rho$ is a parameter:

$$\frac{1}{1+(\rho \times \alpha)}$$

According to the above formulas, if one port module 28 is active and $\rho$ is two, central agent 34 reserves one third of the credits and may allocate up to two thirds of the credits to port module 28; if two port modules 28 are active and $\rho$ is one, central agent 34 reserves one third of the credits and may allocate up to one third of the credits to each port module 28 that is active; and if twelve port modules 28 are active and $\rho$ is 0.5, central agent 34 reserves two fourteenths of the credits and may allocate up to one fourteenth of the credits to each port module 28 that is active. Although a particular limit is described as being applied to the number of blocks 38 that are being used by a port module 28, the present invention contemplates any suitable limit being applied to the number of blocks 38 that are being used by a port module 28.

When a first port module 28 writes a packet to stream memory 30, first port module 28 can communicate to routing module 36 information from the header of the packet (such as one or more destination addresses) that routing module 36 can use to identify one or more second port modules 28 that are designated port modules 28 of the packet. First port module 28 can also communicate to routing module 36 an address of a first block 38 to which the packet has been written and an offset that together can be used by second port modules 28 to read the packet from stream memory 30. Routing module 36 can identify second port modules 28 using one or more routing tables and the information from the header of the packet and, after identifying second port modules 28, communicate the address of first block 38 and the offset to each second port module 28, which second port module 28 can add to an output queue, as described more fully below.

A port module 28 can include one or more output queues that are used to queue packets that have been written to stream memory 30 for communication out of switch core 26 through port module 28. When a packet is written to stream memory 30, the packet is added to an output queue of each designated port module 28 of the packet. An output queue of a designated port module 28 can correspond to a combination of a level of quality of service (QoS) and a source port module 28. As an example, consider a switch core 26 that provides three levels of QoS and includes four port modules 28 including both input logic and output logic. A first port module 28 includes nine output queues: a first output queue corresponding to the first level of QoS and a second port module 28; a second output queue corresponding to the first level of QoS and a third port module 28; a third output queue corresponding to the first level of QoS and a fourth port module 28; a fourth output queue corresponding to the second level of QoS and second port module 28; a fifth output queue corresponding to the second level of QoS and third port module 28; a sixth output queue corresponding to the second level of QoS and fourth port module 28; a seventh output queue corresponding to the third level of QoS and second port module 28; an eighth output queue corresponding to the third level of QoS and third port module 28; and a ninth output queue corresponding to the third level of QoS and fourth port module 28. A packet that has been written to stream memory 30 is added to the first output queue of first port module 28 if (1) the packet has been written to stream memory 30 from second port module 28, (2) first port module 28 is a designated port module 28 of the packet, and (3) the level of QoS of the packet is the first level of QoS. A packet that has been written to stream memory 30 is added to the fifth output queue of first port module 28 if (1) the packet has been written to stream memory 30 from third port module 28, (2) first port module 28 is a designated port module 28 of the packet, and (3) the level of QoS of the packet is the second level of QoS. A packet that has been written to stream memory 30 is added to the ninth output queue of first port module 28 if (1) the packet has been written to stream memory 30 from fourth port module 28, (2) first port module 28 is a designated port module 28 of the packet, and (3) the level of QoS of the packet is the third level of QoS.

Second port module 28 also includes nine output queues: a first output queue corresponding to the first level of QoS and a first port module 28; a second output queue corresponding to the first level of QoS and a third port module 28; a third output queue corresponding to the first level of QoS and a fourth port module 28; a fourth output queue corresponding to the second level of QoS and first port module 28; a fifth output queue corresponding to the second level of QoS and third port module 28; a sixth output queue corresponding to the second level of QoS and fourth port module 28; a seventh output queue corresponding to the third level of QoS and first port module 28; an eighth output queue corresponding to the third level of QoS and third port module 28; and a ninth output queue corresponding to the third level of QoS and fourth port module 28. A packet that has been written to stream memory 30 is added to the first output queue of second port module 28 if (1) the packet has been written to stream memory 30 from first port module 28, (2) second port module 28 is a designated port module 28 of the packet, and (3) the level of QoS of the packet is the first level of QoS. A packet that has been written to stream memory 30 is added to the fifth output queue of second port module 28 if (1) the packet has been written to stream memory 30 from third port module 28, (2) second port module 28 is a designated port module 28 of the packet, and (3) the level of QoS of the packet is the second level of QoS. A packet that has been written to stream memory 30 is added to the ninth output queue of second port module 28 if (1) the packet has been written to stream memory 30 from fourth port module 28, (2) second port module 28 is a designated port module 28 of the packet, and (3) the level of QoS of the packet is the third level of QoS.

Third port module 28 and fourth port module 28 each include output queues similar to the output queues of first port module 28 and the output queues of second port module 28 described above. QoS can encompass rate of transmission, rate of error, or other aspect of the communication of packets through switch core 26, and reference to QoS can include class of service (CoS), where appropriate. Although an output queue of a first port module 28 is described as corresponding to a second port module 28 and a level of QoS, an output queue of a first port module 28 need not necessarily correspond to a second port module 28 and a level of QoS. As an example, in particular embodiments, an output queue of a first port module 28 can correspond to a second port module 28 and not a level of QoS.

An output queue of a port module 28 includes a register of port module 28 and, if there is more than one packet in the output queue, one or more entries in a memory structure of port module 28, as described below. A port module 28 includes a memory structure that can include one or more linked lists that port module 28 can use, along with one or more registers, to determine a next packet to read from stream memory 30. The memory structure includes multiple entries, at least some of which each correspond to a block 38 of stream memory 30. Each block 38 of stream memory 30 has a corresponding entry in the memory structure. An entry in the memory structure can include a pointer to another entry in the memory structure, resulting in a linked list. A port module 28 also includes one or more registers that port module 28 can also use to determine a next packet to read from stream memory 30. A register includes a write pointer, an offset, and a read pointer. The write pointer can point to a first block 38 to which a first packet has been written, the offset can indicate a first word 40 to which the first packet has been written, and the read pointer can point to a first block 38 to which a second packet (which could be the same packet as or a packet other than the first packet) has been written. Because entries in the memory structure each correspond to a block 38 of stream memory 30, a pointer that points to a block 38 also points to an entry in the memory structure.

Port module 28 can use the write pointer to determine a next entry in the memory structure to which to write an offset. Port module 28 can use the offset to determine a word 40 of a block 38 at which to start reading from block 38. Port module 28 can use the read pointer to determine a next packet to read from stream memory 30. Port module 28 can also use the write pointer and the read pointer to determine whether more than one packet is in the output queue. If output queue is not empty and the write pointer and the read pointer both point to the same block 38, there is only one packet in the output queue. If there is only one packet in the output queue, port module 28 can determine a next packet to read from stream memory 30 and read the next packet from stream memory 30 without accessing the memory structure.

If a first packet is added to the output queue when there are no packets in the output queue, (1) the write pointer in the register is modified to point to a first block 38 to which the first packet has been written, (2) the offset is modified to indicate a first word 40 to which the first packet has been written, and (3) the read pointer is also modified to point to first block 38 to which the first packet has been written. If a second packet is added to the output queue before port module 28 reads the first packet from stream memory 30, (1) the write pointer is modified to point to a first block 38 to which the second packet has been written, (2) the offset is written to a first entry in the memory structure corresponding to first block 38 to which the first packet has been written and then modified to indicate a first word 40 to which the second packet has been written, and (3) a pointer in the first entry is modified to point to first block 38 to which the second packet has been written. The read pointer is left unchanged such that, after the second packet is added to the output queue, the read pointer still points to first block 38 to which the first packet has been written. As described more fully below, the read pointer is changed when port module 28 reads a packet in the output queue from stream memory 30. If a third packet is added to the output queue before port module 28 reads the first packet and the second packet from stream memory 30, (1) the write pointer is modified to point to a first block 38 to which the third packet has been written, (2) the offset is written to a second entry in the memory structure corresponding to first block 38 to which the second packet has been written and modified to indicate a first word 40 to which the third packet has been written, and (3) a pointer in the second entry is modified to point to first block 38 to which the third packet has been written. The read pointer is again left unchanged such that, after the third packet is added to the output queue, the read pointer still points to first block 38 to which the first packet has been written.

Port module 28 can use the output queue to determine a next packet to read from stream memory 30. As an example, consider the output queue described above in which there are three packets. In the register, (1) the write pointer points to first block 38 to which the third packet has been written, (2) the offset indicates first word 40 to which the third packet has been written, and (3) the read pointer points to first block 38 to which the first packet has been written. The first entry in the memory structure includes (1) an offset that indicates first word 40 to which the first packet has been written and (2) a pointer that points to first block 38 to which the second packet has been written. The second entry in the memory structure includes (1) an offset that indicates first word 40 to which the second packet has been written and (2) a pointer that points to first block 38 to which the third packet has been written.

Port module 28 compares the read pointer with the write pointer and determines, from the comparison, that there is more than one packet in the output queue. Port module 28 then uses the read pointer to determine a next packet to read from stream memory 30. The read pointer refers port module 28 to first block 38 of the first packet, and, since there is more than one packet in the output queue, port module 28 accesses the offset in the first entry indicating first word 40 to which the first packet has been written. Port module 28 then reads the first packet from stream memory 30, using the offset in the first entry, starting at first block 38 to which the first packet has been written. If the first packet has been written to more than one block 38, port module 28 can use a linked list in tag memory 32 to read the first packet from memory, as described above.

While port module 28 is reading the first packet from stream memory 30, port module 28 copies the pointer in the first entry to the read pointer, compares the read pointer with the write pointer, and determines, from the comparison, that there is more than one packet in the output queue. Port module 28 then uses the read pointer to determine a next packet to read from stream memory 30. The read pointer refers port module 28 to first block 38 of the second packet, and, since there is more than one packet in the output queue, port module 28 accesses the offset in the second entry indicating first word 40 to which the second packet has been written. When port module 28 has finished reading the first packet from stream memory 30, port module 28 reads the second packet from stream memory 30, using the offset in the second entry, starting at first block 38 to which the second packet has been written. If the second packet has been written to more than one block 38, port module 28 can use a linked list in tag memory 32 to read the second packet from memory, as described above.

While port module 28 is reading the second packet from stream memory 30, port module 28 copies the pointer in the second entry to the read pointer, compares the read pointer with the write pointer, and determines, from the comparison, that there is only one packet in the output queue. Port module 28 then uses the read pointer to determine a next packet to read from stream memory 30. The read pointer refers port module 28 to third block 38 of the second packet, and, since there is only one packet in the output queue, port module 28 accesses the offset in the register indicating first word 40 to which the third packet has been written. When port module 28 has finished reading the second packet from stream memory 30, port module 28 reads the third packet from stream memory 30, using the offset in the register, starting at first block 38 to which the third packet has been written. If the third packet has been written to more than one block 38, port module 28 can use a linked list in tag memory 32 to read the third packet from memory, as described above.

If a port module 28 includes more than one output queue, an algorithm can be used for arbitration among the output queues. Arbitration among multiple output queues can include determining a next output queue to use to determine a next packet to read from stream memory 30. Arbitration among multiple output queues can also include determining how many packets in a first output queue to read from stream memory 30 before using a second output queue to determine a next packet to read from stream memory 30. The present invention contemplates any suitable algorithm for arbitration among multiple output queues. As an example and not by way of limitation, according to an algorithm for arbitration among multiple output queues of a port module 28, port module 28 accesses output queues that are not empty in a series of rounds. In a round, port module 28 successively accesses the output queues in a predetermined order and, when port module 28 accesses an output queue, reads one or more packets in the output queue from stream memory 30. The number of packets that port module 28 reads from an output queue in a round can be the same as or different from the number of packets that port module 28 reads from each of one or more other output queues of port module 28 in the same round. In particular embodiments, the number of packets that can be read from an output queue in a round is based on a quantum value that defines an amount of data according to which more packets can be read form the output queue if smaller packets are in the output queue and fewer packets can be read from the output queue if larger packets are in the output queue, which can facilitate fair sharing of an output link of port module 28.

Figure 5:
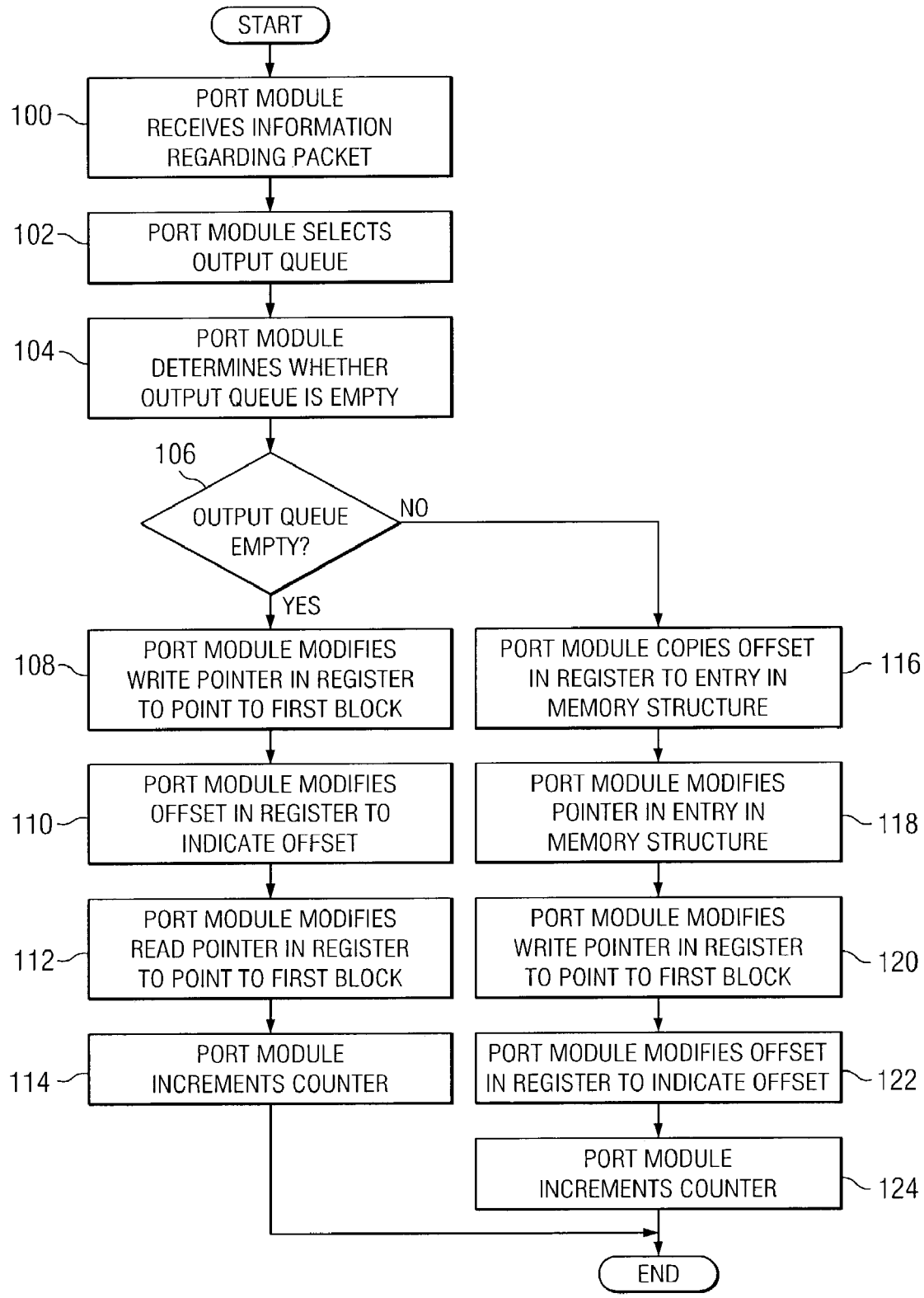
FIG. 5 illustrates an example method for queuing packets written to memory for switching.

FIG. 5 illustrates an example method for queuing packets written to memory for switching. The method begins at step 100, where a port module 28 receives from routing module 36 information regarding a packet that has been written to stream memory 30. In particular embodiments, the information includes an address of a first block 38 to which the packet has been written, an offset indicating a first word 40 to which the packet has been written, and other information identifying a port module 28 that has written the packet to stream memory 30 and indicating the level of QoS of the packet. At step 102, port module 28 selects, from multiple output queues of port module 28, an output queue corresponding to source port module 28 from which the packet has been written to stream memory 30 and the level of QoS of the packet. At step 104, port module 28 determines whether the output queue is empty. Port module 28 can monitor the number of packets in the output queue using a counter. Port module 28 can increment the counter by an amount when port module 28 receives from routing module 36 information regarding a packet and the packet is added to the output queue. Port module 28 can decrement the counter when a packet in the output queue is read from stream memory 30. At step 106, if the output queue is empty, the method proceeds to step 108. At step 108, port module 28 modifies the write pointer in the register of the output queue to point to first block 38. At step 110, port module 28 modifies the offset in the register to indicate first word 40. At step 112, port module 28 modifies the read pointer in the register to point to first block 38. At step 114, port module 28 increments the counter, at which point the method ends.

Returning to step 106, if the output queue is not empty, the method proceeds to step 116. At step 116, port module 28 copies the offset in the register of the output queue to an entry in the memory structure of port module 28 that corresponds to a block 38 to which the write pointer in the register points. At step 118, port module 28 modifies a pointer in the entry to point to first block 38. In particular embodiments, steps 116 and 118 can occur in one write operation, which can reduce bandwidth requirements associated with the memory structure. At step 120, port module 28 also modifies the write pointer in the register to point to first block 38. At step 122, port module 28 modifies the offset in the register to indicate first word 40. At step 124, port module 28 increments the counter, at which point the method ends. Although particular steps of the method described above are described and illustrated as occurring in a particular order, the present invention contemplates the steps of the method described above occurring in any suitable order.

Figure 6:
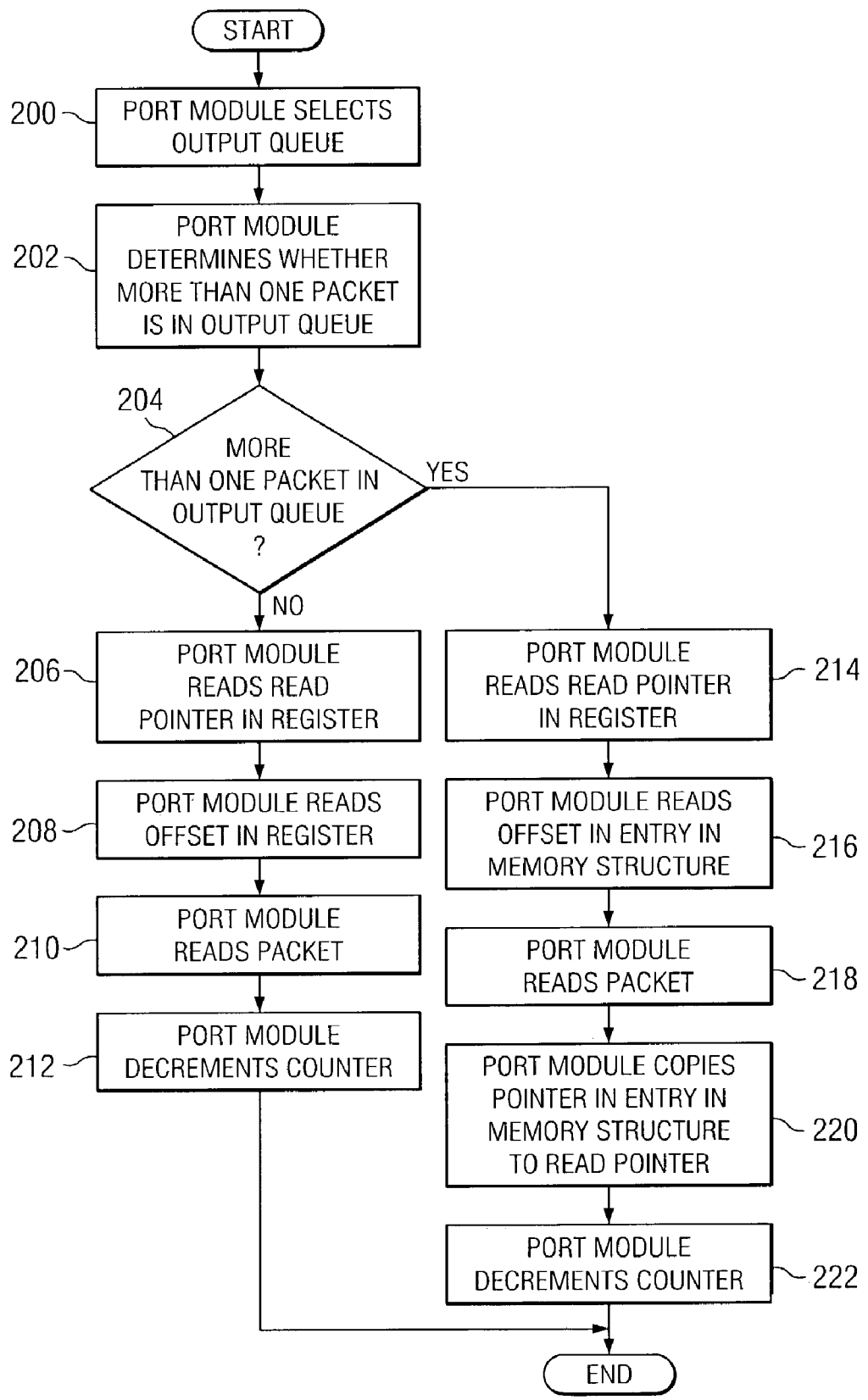
FIG. 6 illustrates another example method for queuing packets written to memory for switching.

FIG. 6 illustrates another example method for queuing packets written to memory for switching. The method begins at step 200, where port module 28 selects an output queue from among multiple output queues. As described above, port module 28 can select an output queue according to an algorithm for arbitration among multiple output queues. At step 202, port module 28 determines whether there is more than one packet in the output queue. Port module 28 can make this determination by comparing a read pointer in a register of the output queue with a write point in the register. At step 204, if there is only one packet in the output queue, the method proceeds to step 206. At step 206, port module 28 reads the read pointer in the register. At step 208, port module 28 reads an offset in the register. Because only one packet is in the output queue, port module 28 need not access the memory structure of port module 28, which can reduce latency associated with the transmission of packets that are in the output queue. At step 210, port module 28 reads a packet from stream memory 30 starting at a block 38 to which the read pointer points and a word 38 which the offset indicates. If the packet has been written to more than one block 38, port module 28 can use a linked list in tag memory 32 to read the packet from memory, as described above. At step 212, port module 28 decrements a counter, at which point the method ends. As described above, port module 28 can monitor the number of packets in the output queue using a counter.

Returning to step 204, if there is more than one packet in the output queue, the method proceeds to step 214. At step 214, port module 28 reads the read pointer in the register. At step 216, port module 28 reads an offset in an entry of a memory structure of the port module 28 corresponding to a block 38 to which the read pointer points. At step 218, port module 28 reads a packet from stream memory 30 starting at block 38 to which the read pointer points and a word 38 which the offset in the memory structure indicates. If the packet has been written to more than one block 38, port module 28 can use a linked list in tag memory 32 to read the packet from memory, as described above. At step 220, port module 28 copies a pointer in the entry in the memory structure to the read pointer so that the read pointer points to a block 38 to which the pointer in the entry points. At step 222, port module decrements the counter, at which point the method ends. Although particular steps of the method described above are described and illustrated as occurring in a particular order, the present invention contemplates the steps of the method described above occurring in any suitable order. In particular embodiments, the memory structure of a port module 28 covers all of stream memory 30, which eliminates packet drops caused by resource shortages in the output queues of port module 28. In addition, because the information regarding a first packet is stored in a register of the port module 28 and port module 28 need not access the memory structure, the memory structure can be activated after the first packet arrives at port module 28

Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system for queuing packets written to memory for switching, the system comprising:
   a data memory logically divided into a plurality of blocks;
   a plurality of input ports each operable to receive packets and write the packets to the data memory; and
   a plurality of output ports each having a memory structure and one or more output queue pointers, the memory structure comprising a plurality of memory structure entries that each correspond to one of the blocks, each of the memory structure entries comprising a memory structure next pointer operable to link to another one of the memory structure entries, an output queue pointer being operable to link to one of the memory structure entries, the output queue pointers and memory structure next pointers forming output queue linked lists, each of the output ports operable to read packets stored in the data memory using the output queue linked lists and to communicate the packets.

2. The system of claim 1, wherein the output port is operable to read an only packet in an output queue linked list independent of the memory structure.

3. The system of claim 1, wherein the output queue linked lists each comprise memory structure entries that each correspond to a first block of a packet written to the data memory.

4. The system of claim 1, further comprising a tag memory that comprises a plurality of tag memory entries that each correspond to one of the blocks, each of the tag memory entries comprising a tag memory next pointer operable to link to another one of the tag memory entries, the tag memory next pointers forming tag memory linked lists that are used by the input ports to write packets to the data memory and by the output ports to read packets stored in more than one of the blocks.

5. The system of claim 1, wherein each of the output queue pointers corresponds to one of the input ports and one of a plurality of quality of service (QoS) levels.

6. The system of claim 1, wherein:
   a register comprises one of the output queue pointers and an offset for a packet; and
   each of the memory structure entries also comprises an offset for a packet.

7. The system of claim 6, wherein:
   the register further comprises a write pointer operable to link to a last packet in an output queue linked list; and
   the offset in the register is for the last packet in the output queue linked list.

8. The system of claim 1, wherein an output port uses an algorithm to arbitrate among the output queue pointers.

9. The system of claim 1, wherein the system is embodied in a single integrated circuit (IC).

10. The system of claim 1, wherein the system operates in an Ethernet switching environment, an INFINIBAND switching environment, a 3GIO switching environment, a HYPERTRANSPORT switching environment, a RAPID IO switching environment, or a proprietary backplane switching environment.

11. A method for queuing packets written to memory for switching, the method comprising:

using one or more output queue linked lists, reading packets stored in a data memory that is logically divided into a plurality of blocks, each of the output queue linked lists comprising an output queue pointer and one or more memory structure next pointers that are each in a memory structure entry of a memory structure, each of the memory structure entries corresponding to one of the blocks, each of the memory structure next pointers linking to another one of the memory structure entries, the output queue pointer linking to one of the memory structure entries; and communicating the packets.

12. The method of claim 11, comprising reading an only packet in an output queue linked list independent of the memory structure.

13. The method of claim 11, wherein the output queue linked lists each comprise memory structure entries that each correspond to a first block of a packet written to the data memory.

14. The method of claim 11, comprising:

using tag memory linked lists, writing packets to the data memory, each of the tag memory linked lists comprising two or more tag memory next pointers that are each in a tag memory entry of a tag memory, each of the tag memory entries corresponding to one of the blocks, each of the tag memory next pointers linking to another one of the tag memory entries; and using the tag memory linked lists, reading packets stored in more than one of the blocks.

15. The method of claim 11, wherein each of the output queue pointers corresponds to one of a plurality of input ports and one of a plurality of quality of service (QoS) levels.

16. The method of claim 11, wherein:

a register comprises one of the output queue pointers and an offset for a packet; and each of the memory structure entries also comprises an offset for a packet.

17. The method of claim 16, wherein:

the register further comprises a write pointer operable to link to a last packet in a linked list; and the offset in the register is for the last packet in the linked list.

18. The method of claim 11, further comprising using an algorithm to arbitrate among the output queue pointers.

19. The method of claim 11, wherein the method is executed by a single integrated circuit (IC).

20. The method of claim 11, wherein the method is executed in an Ethernet switching environment, an INFINIBAND switching environment, a 3GIO switching environment, a HYPERTRANSPORT switching environment, a RAPID IO switching environment, or a proprietary backplane switching environment.

21. A system for queuing packets written to memory for switching in an Ethernet switching environment, an INFINIBAND switching environment, a 3GIO switching environment, a HYPERTRANSPORT switching environment, a RAPID IO switching environment, or a proprietary backplane switching environment, the system being embodied in a single integrated circuit (IC) and comprising:

a data memory logically divided into a plurality of blocks;

a plurality of input ports each operable to receive packets and write the packets to the data memory;

a plurality of output ports each having a memory structure and one or more output queue pointers, the memory structure comprising a plurality of memory structure entries that each correspond to one of the blocks, each of the output queue pointers corresponding to one of the input ports and one of a plurality of quality of service (QoS) levels, each of the memory structure entries comprising a memory structure next pointer operable to link to another one of the memory structure entries, each of the memory structure entries also comprising an offset for a packet, an output queue pointer being operable to link to one of the memory structure entries, the output queue pointers and memory structure next pointers forming output queue linked lists that each comprise memory structure entries that each correspond to a first block of a packet written to the data memory, a register comprising one of the output queue pointers, an offset for a last packet in the output queue linked list, and a write pointer operable to link to the last packet in an output queue linked list, each of the output ports operable to use an algorithm to arbitrate among the output queue pointers, read packets stored in the data memory using the output queue linked lists, and communicate the packets; and a tag memory comprising a plurality of tag memory entries that each correspond to one of the blocks, each of the tag memory entries comprising a tag memory next pointer operable to link to another one of the tag memory entries, the tag memory next pointers forming tag memory linked lists that are used by the input ports to write packets to the data memory and by the output ports to read packets stored in more than one of the blocks.

22. A system for queuing packets written to memory for switching, the system comprising:

means for, using one or more output queue linked lists, reading packets stored in a data memory that is logically divided into a plurality of blocks, each of the output queue linked lists comprising an output queue pointer and one or more memory structure next pointers that are each in a memory structure entry of a memory structure, each of the memory structure entries corresponding to one of the blocks, each of the memory structure next pointers linking to another one of the memory structure entries, the output queue pointer linking to one of the memory structure entries; and means for communicating the packets.

* * * * *